United States Patent [19]

Rodriguez

[11] Patent Number: 5,312,211

[45] Date of Patent: May 17, 1994

[54] METHOD AND SYSTEM FOR EMBODYING A PLANE REFERENCE SURFACE DEFINED BY A SPECIFIC EQUATION ON AN ASSEMBLING FRAME OF A STRUCTURE FROM A ROUGH SURFACE

[75] Inventor: Georges J. Rodriguez, Gignac, France

[73] Assignee: Aerospatiale Societe Nationale Industrielle, Paris, France

[21] Appl. No.: 689,532

[22] Filed: Apr. 23, 1991

[30] Foreign Application Priority Data

May 4, 1990 [FR] France ................................. 90 05650

[51] Int. Cl.$^5$ ............................................. B23C 1/20
[52] U.S. Cl. .................................... 409/79; 356/376; 409/84; 409/131; 409/178
[58] Field of Search ................. 409/131, 132, 79, 84, 409/96, 128, 178, 179, 186, 188, 191, 193, 195, 201, 207, 209, 210, 216, 218; 408/14, 16; 356/376

[56] References Cited

U.S. PATENT DOCUMENTS

| | | | |
|---|---|---|---|
| 3,382,768 | 5/1968 | Mount | 409/178 |
| 4,559,684 | 12/1985 | Pryor | 29/156.4 |
| 4,754,415 | 6/1988 | George et al. | 364/513 |
| 4,818,160 | 4/1989 | Rabe et al. | 409/211 X |

Primary Examiner—Z. R. Bilinsky
Attorney, Agent, or Firm—Fisher, Christen & Sabol

[57] ABSTRACT

A method is provided for embodying a plane reference defined by a specific equation within a rough surface of a frame of a structure being assembled. The equation characterizing the reference surface is stored in a memory. With the aid of an optical sighting mechanism, spatial data is obtained which makes it possible to calculate an equation characterizing the rough surface. The data relating to the equations of the reference surface and the rough surface are compared in an information processing unit. A mobile machining device is positioned close to the rough surface. The machining device is controlled by specific orders generated by the comparison of the equations for the reference and rough surfaces respectively. The machining device gradually rectifies the rough surface to make it progressively coincide with that of the spatial equation of the reference surface.

11 Claims, 4 Drawing Sheets

METHOD AND SYSTEM FOR EMBODYING A PLANE REFERENCE SURFACE DEFINED BY A SPECIFIC EQUATION ON AN ASSEMBLING FRAME OF A STRUCTURE FROM A ROUGH SURFACE

FIELD OF THE INVENTION

The present invention concerns a method for embodying a plane reference surface defined by a specific equation on a frame for assembling a structure from a rough surface, as well as a system for implementing said method.

BACKGROUND OF THE INVENTION

Although not exclusively, the present invention more particularly concerns aeronautical construction applications and also the construction of helicopters.

The production of helicopters is a complex operation implementing elaborated techniques and is subject to extremely strict production norms. These norms are imposed by two essential requirements:
  the safety of the product in use,
  the guarantee of an equal production quality throughout the lifetime of the product so as to ensure:
    firstly, the assembling during production without any finishing operation of the various elements constituting the product,
    and secondly after production, providing customers with standard spare parts.

Thus, the assembling of the elements constituting the structure of a helicopter, for example, needs to satisfy interchangeability requirements. So as to ensure this interchangeability, the elements to be assembled are kept in place on frames with the aid of braces secured to areas, that is, steel parallelepipedic plates sealed to the frame.

Generally speaking, the assembling frames are embodied from relatively light tubes having a square section, but with a large amount of inertia. They may be assembled by arc welding followed by stress-free annealing. Thus, frames are obtained having considerable rigidity on bending and torsion, but which are inexpensive and simple to produce. Once the frame has been produced, it is brought to its implantation site and finally cemented to the ground. The need to provide the areas for bracing the helicopter elements being assembled which were mentioned earlier is explained by the fact that the rough welded faces of the frame are not sufficiently precise to use as a base for fixing to the various braces. The areas are sealed to the frame girders by gluing them with resin or a similar substance, which allows a backlash of the gaps between the areas to be permitted by the resin thickness allowable for glueing. In fact, up until now, the adjustment of the frames has been accomplished by placing templates and standards on said frames. These areas are sealed and the braces used to support the elements to be assembled are secured to the areas of the frames.

These templates and standards are required for the production of new frames and the periodic checking of operational frames.

This involves producing a large number of templates and standards taking up a large amount of space and requires a costly complicated management of these tools for the periodic control of frames.

Thus, it would be desirable to avoid having to use these templates and standards. However, this brings up a new problem to the extent that the bracing areas would thus no longer be kept in place by rigid templates, thus rendering totally ineffective the method used up until now, that is of glueing the areas to the girders of the frame.

SUMMARY OF THE INVENTION

The object of the present invention is to resolve these drawbacks and concerns a method for embodying a plane reference surface, having a rough surface, defined by a specific equation within a frame of a structure, which is being assembled. This method is applicable, in particular, for the machining of an area, such as the bracing area defined above, after welding the latter onto a girder of the structure assembling frame. This machining makes it possible to avoid resorting to using the templates and standards used up until now, while avoiding the problem relating to the usual gluing of the area, the latter simply being welded to the corresponding girder of the frame.

To this effect, the method of the invention for embodying a plane reference surface defined by a specific equation within an assembly frame of a structure which had previously had only a rough surface is notable in that:
  the data relating to the equation of said reference surface is stored in memory means;
  with the aid of optical sighting means, data are determined making it possible to calculate the equation characterizing said rough surface;
  the data relating to the equations of said reference surface and said rough surface are compared in an information processing unit;
  a mobile machining device is positioned close to said rough surface, and
  with the aid of said machining device controlled by specific orders according to said comparison and provided by said information processing unit, said rough surface is corrected so as to make the plane of the latter progressively coincide with that of said reference surface.

Thus, concerning the application described above, the system of the invention makes it possible to rectify "in situ" the plates or areas supporting the holding devices of the structural elements, which may then simply be welded to the frame without resorting to using the templates and standards used up until now.

Contrary to the case with normal machining in which the machining device is at a fixed station, the machining device of the present invention is mobile and positioned with respect to the piece to be machined, that is the assembling frame.

After an initialization process making it possible to bring the various axes of the machining device into a predetermined position, the working plane of the tool of the machining device is advantageously brought parallel to the plane of said reference surface.

The orders for controlling the machining device provided by said information processing unit are preferably corrected so as to take account of any deformation of the frame generated by installing the machining device on said frame.

The present invention also concerns a system for embodying a plane reference surface defined by a specific equation on an a frame for assembling à structure, the assembly frame previously only having a rough surface, e.g., so as to implement the previously defined method, this system being notable in that it includes:

memory means to store the data relating to the spatial equation characterizing said reference surface;

optical sighting means to determine data making it possible to calculate the spatial equation characteristic of said rough surface;

a mobile machining device able to be mounted and move on a girder of the frame close to said rough surface, and an information processing unit able to compare the data relating to firstly the equation of said reference surface, and secondly to the equation of said rough surface, and, on the basis of this comparison, to provide orders to said machining device controlled in such a way as to make the plane of said rough surface coincide with the plane of said reference surface.

Said machining device is advantageously mounted on a girder of the frame with the aid of two rectangular mountings supporting a plate blocked against the bottom of the girder.

According to a further characteristic of the invention, said machining device comprises an X, Y table. The X, Y table may be integral with a first plate which is able to rotate around a first axis Y, the table/first plate unit itself being mounted on a second plate which is able to rotate around a second axis X orthogonal to said first axis and parallel to said table. In addition, said machining device may comprise means for translational movement along a third axis Z orthogonal to the plane of said X, Y table.

Said machining device preferably comprises a tool which is rotary-driven by means of a gearing comprising a conical gear gearing with a conical wheel linked to the shaft of the tool.

According to another characteristic of the invention, said optical sighting means are constituted by a distance data processing measuring device provided with electronic theodolites connected to a computer.

Said optical sighting means may in particular be associated with additional memory means in which the data relating to the equations of a plurality of reference surfaces are stored.

BRIEF DESCRIPTION OF THE DRAWINGS

The figures of the accompanying drawing shall clearly explain how the invention may be embodied.

DETAILED DESCRIPTION OF THE PREFERRED EMBODIMENTS

Figure 1:
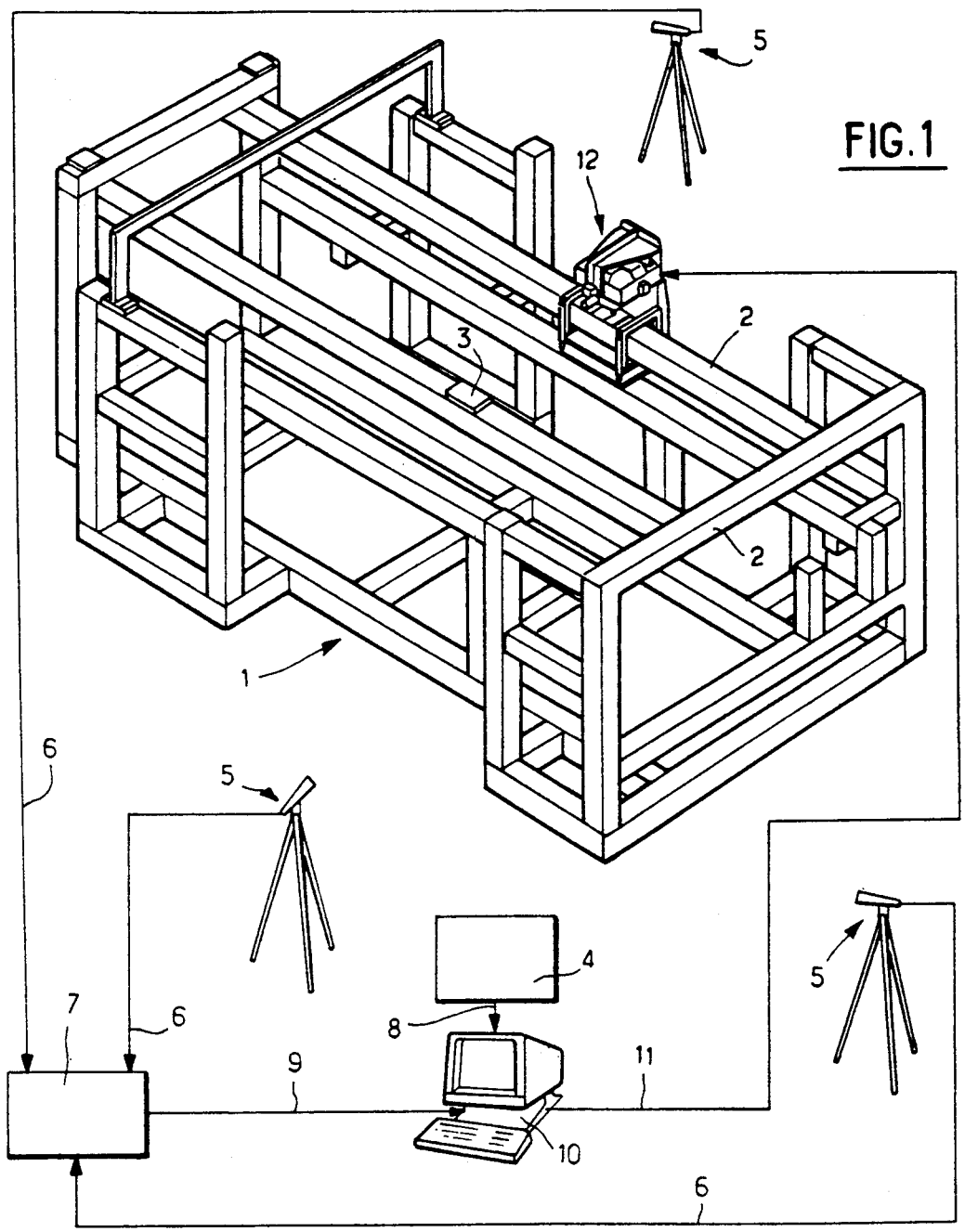
FIG. 1 diagrammatically shows one embodiment example of the system for embodying plane reference surfaces, each defined by a specific equation, on an assembling frame of a structure from rough surfaces.

FIG. 1 diagrammatically shows a system conforming to the invention and intended to machine the areas or plates defined above of an assembling frame 1 of a structure, such as a helicopter, this frame being constituted, as already specified, by square sectional girders or tubes 2 at specific locations where plates 3 are disposed by being welded to the respective tubes. As already indicated, the system of the invention makes it possible to embody a plane reference surface defined by a specific equation on said frame within a previously rough surface.

Generally speaking, the system includes:

memory means 4 in which the data relating to the equation of the reference surface of each plate 3 to be machined is stored;

optical sighting means to determine data making it possible to calculate the equation of the rough surface of the plate and comprising electronic theodolites 5, three in the example represented, each connected by a link 6 to a computer 7 (such optical sighting means may be produced and sold by the Swiss KERN SA company);

the memory means 4 and the computer 7 are connected by the respective links 8 and 9 to a data processing unit 10 able to compare the data relating to firstly the equation of said reference surface, and secondly to the equation of said rough surface and, on the basis of this comparison, provide orders transmitted by the link 11 so as to control a machining device 12 so as to make the plane of said rough surface coincide with that of said reference surface.

Figure 2:
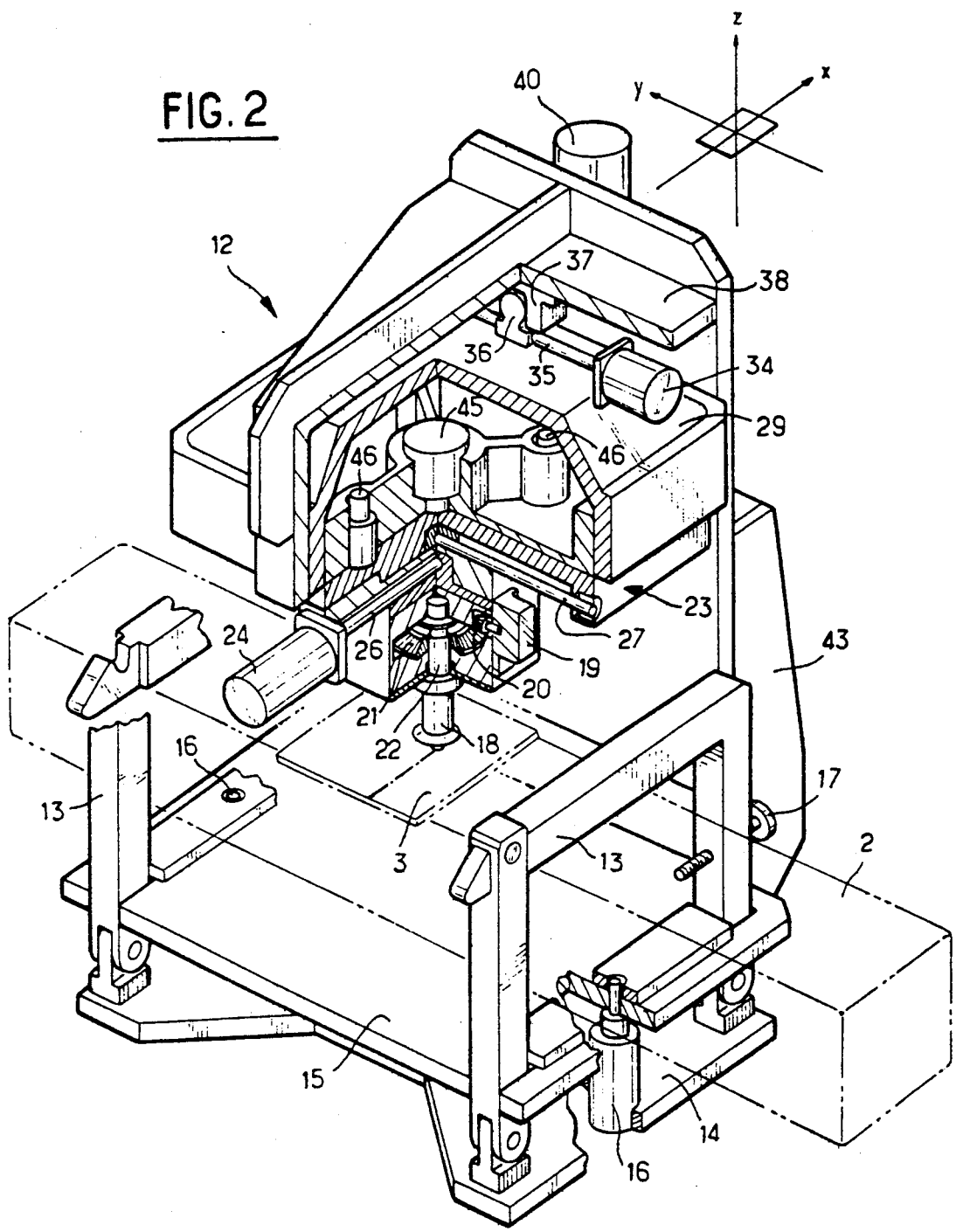
FIG. 2 is a front perspective view showing the internal disposition of the machining device used in the system of the invention.
Figure 3:
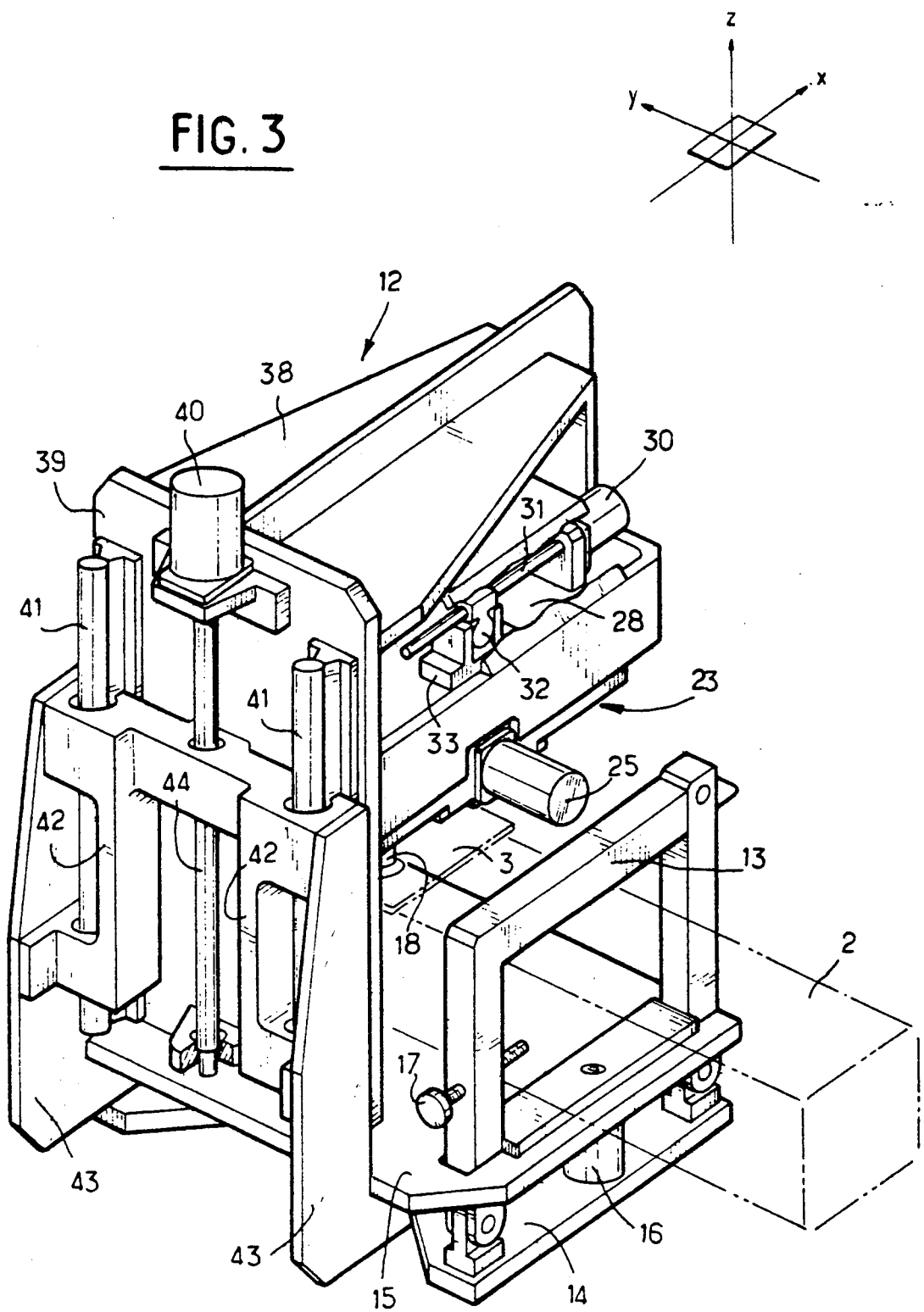
FIG. 3 is a rear perspective view showing the internal disposition of the machining device of FIG. 2.

With reference now to FIGS. 2 and 3, the machining device 12 is mounted and able to move on a tube 2 of the frame at the level of a plate 3 to be machined with the aid of two rectangular mountings 13 mounted on a base 14 and supporting an interchangeable plate 15 according to the location of the plate to be machined, said plate 15 being blocked against the bottom of the tube 2 by means of hydraulic jacks 16 integral with the base 14, and screws 17 ensuring the lateral blocking of the mountings 13 against the tube 2.

The machining device 12 comprises a tool 18, in particular a cutter as the one shown or a piercing drill, driven by a hydraulic motor 19 by means of a gearing comprising a conical gear 20 linked to the motor 19 gearing with a conical wheel 21 linked to the shaft 22 of the tool 18.

The main function of the machining device 12 is to correct any production deviations of the rough frame after welding.

So as to be able to carry out the machining by means of the tool 18, three translation movements along the axes X, Y and Z are required, whereas, so as to obtain a correct orientation of the tool 18 in space, two movements are required allowing for rotations around the axes X and Y.

To this effect, an X, Y table 23 is provided (the tool 18 being mounted under the X, Y table 23), a first step motor 24 ensuring movement along the axis X (FIG. 2), whereas a second step motor 25 ensures movement along the axis Y (FIG. 3) by means of suitably-adapted screw/nut type linking members 26 and 27 respectively. Guiding is moreover ensured by conventional rails and slides (not shown).

Moreover, so as to obtain the specified orientation of the tool 18 in space, the X, Y table 23 is integral with a first plate 28 able to rotate around the axis Y, this unit itself being mounted on a second plate 29 able to rotate around the axis X.

Rotation of the plate 28 around the axis Y is ensured by a step motor 30 connected by means of suitable screw/nut type linking members 31 to a joint 32 able to pivot inside a seat 33 integral with the first plate 28. Similarly, rotation of the plate 29 around the axis X is ensured by a step motor 34 connected by suitable screw/nut type linking members to a joint 36 able to pivot inside a seat 37 integral with the console 38.

In addition, translation along the axis Z shall make it possible to:
adjust the cut depth during the cutting stage, and
position the tool at the time of piercing.

To this effect, a table 39 is firstly provided integral with said console 38 and extending perpendicular thereto parallel to the axis Z on which a step motor 40 is mounted and guided in its movement along the axis Z on columns 41 able to slide into corresponding slides 42 mounted on support tabs 43 integral with the plate 15, the motor 40 driving a screw/nut unit 44 linked to the plate 15. Secondly, a hydraulic jack 45 is guided on columns 46 integral with the X, Y table 23.

The system of the invention may be embodied as follows:

First of all, it ought to be mentioned that the movements of the machining device are calculated in a reference system linked to the latter. These movements are elaborated from a reference system linked to the template of the frame 1 to be embodied derived from the information processing unit 10. Before carrying out machining the plates or areas 3 of a frame 1, it shall thus be necessary to previously make the reference system linked to the machining device conform to the reference system describing the frame.

Furthermore, the information relating to the equations of the reference surfaces of the plates or areas to be machined is contained in a first file, whereas, after sighting all the areas to be machined, the information relating to the equations of the rough surfaces of the areas shall be stored in a second file.

In a first stage, the frame is orientated according to a given reference system X, Y, Z not taking into account the real position of the areas fixed to the frame. On the basis of the information contained in the first and second files, the deviation between the rough and reference surfaces may be minimized by reorientating the frame plane by plane.

As hooking of the machining device onto the frame may deform the latter, it is then necessary to determine corrected coordinates for the reference surface, these coordinates to be used to control the machining device.

Then an initialization process makes it possible to bring the various axes of the machining device into a predetermined position, the working plane of the tool (for example, a cutter) is brought parallel to the plane of the reference surface, and the actual machining is then able to be effected by transferring the reference system of the frame to the reference system of the machining device.

These various stages shall be described hereafter in detail.

As already indicated, the first file provides the theoretical data required for the machining of each plate or area (reference surface).

The description of an area is distributed over several recordings, each recording being constituted by seven fields.

The first field contains a code defining the significance of the recording:
N: vector normal to the area (Vtn)
O: position of the center of the area (Ctp)
P: coordinates of the hole to be embodied.

The second field contains the number of the area to which the information relates.

The third field is only used for recordings containing a code P and indicates the order in which piercing is carried out.

The following three fields contain:
either the values of the vector normal to the area if the recording code is N;
or the coordinates of the center of the theoretical area if the recording code is 0;
or the coordinates of the hole to be effected if the recording code is P.

The final field contains:
the width L of the area if the recording heading code is 0,
the diameter $\phi$ of the hole to be embodied if the recording code is P.

On the basis of measurements made with the aid of theodolites 5, the second file provides the data making it possible to define the actual frame and its environment. This data constitutes the coordinates x, y and z of the sighted points.

Each recording contains six fields.

The first field contains a code defining the significance of the recording:
M: set of points belonging to the machine,
P: set of points belonging to the sight defined hereafter,
O: coordinates of one of the corners of the actual area (rough surface).

The second field contains the index of the sighted point.

The third point contains the number of the area to which the information relates.

The next three fields contain the values of the coordinates of the points.

Figure 4:
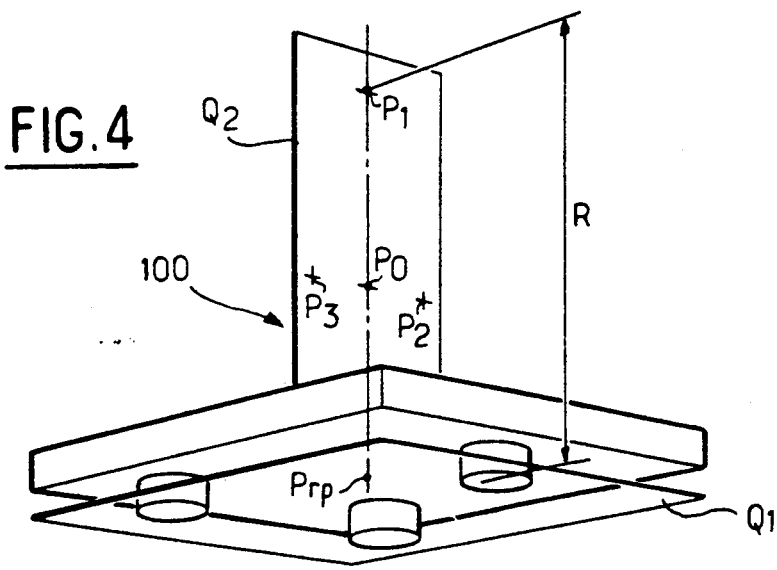
FIG. 4 diagrammatically shows a sight used in implementing the system of the invention.

As can be seen on FIG. 4, the sight 100 is the concrete form of two planes orthogonal with respect to each other:
a first plane Q1 formed of three seating feet,
a second plane Q2 normal to the first one and containing the points P0, P1, P2 and P3.

The geometry of the sight is known via the following data:
the distance R of the point P1 to the plane Q1,
the distance P2 P3,
the points P0, P2, P3 are aligned,
P0 is situated at an equal distance from P2 and P3,
the straight line P1 P0 is normal to the plane Q1.

When reorientating the system of coordinates, the sight is used to determine the position of the actual area and, during machining, is used to determine:
displacement of the actual area due to hooking of the machining device,
the orientation and position of the actual area in space.

On the basis of this data, it is possible to calculate the coordinates of the point P0 from the coordinates of the points P2 and P3, the point P0 being situated at the middle of the segment P2 P3. Similarly, it is possible to calculate the coordinates of the point Prp which is the point of intersection between the plane Q1 and the straight line passing through P0 P1.

From the sighted points on the sight, namely P0, P1, P2 and P3, it is possible to deduce the following information:

Vrn: vector normal to the actual area with the directrix straight line P0 P1;

Prp: intersection of the straight line P0 P1 and the basic plane Q1.

Figure 5:
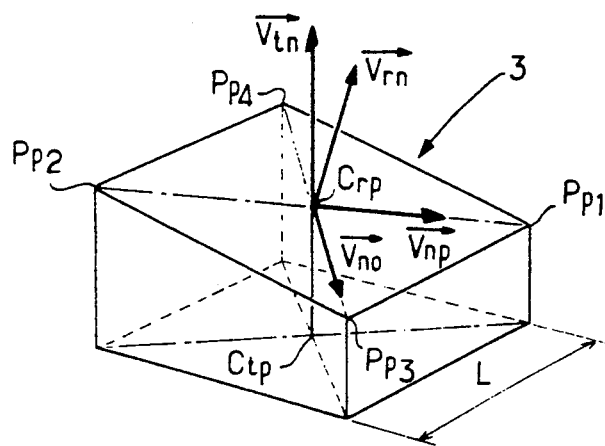
FIG. 5 shows a rough surface to be corrected so as to obtain a reference surface.

Furthermore, with reference to FIG. 5, the data describing the actual area, that is the rough surface obtained after installing the frame, is the following:

the axis system formed of the vectors Vno, Vnp, Vrn, the aforesaid point Prp also belongs to this area, the position of the four corners Pp1, Pp2, Pp3, Pp4, the position of the center of the actual area Crp.

Similarly, the theoretical area (reference surface), provided by the information processing unit (i.e., which desirably will be obtained by machining), is described with the aid of:

Vtn: vector normal to the theoretical area,

Ctp: position of the center of the theoretical area,

L: width of the area.

Figure 6:
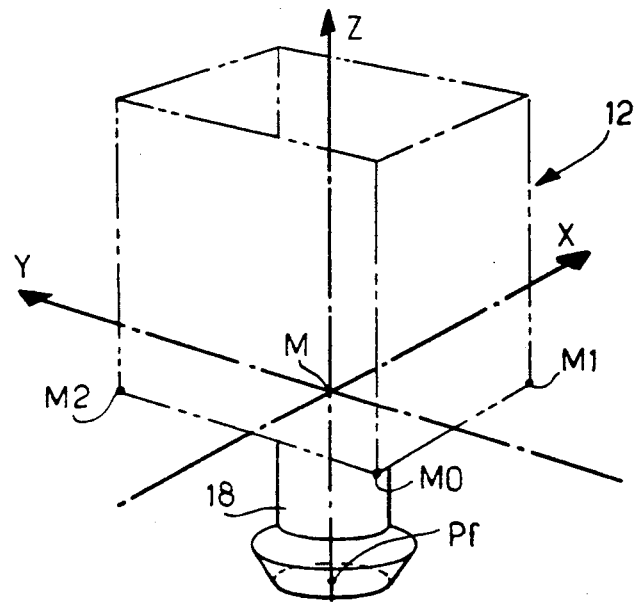
FIG. 6 shows characteristic points of the machining device and used in implementing the system of the invention.

In addition, with reference to FIG. 6, the position of the machining device is determined by the sighting of three points M0, M1, M2. As its geometry is known, characteristic points are defined:

M: intersection of the plane M0, M1, M2 and the axis of rotation of the tool,

O: origin of movement of the machining device, this point being situated at the intersection of the axes of rotation of the correction plate at the end of the phase for initializing the axes of the machine, Pf: coordinates of the point situated at the tool extremity.

One first orientation of the reference system is carried out indicating the direction of the axes of the coordinates X, Y and Z and giving the measuring scale of these axes. This orientation does not take into account the reality of the frame and the actual position of the areas on the latter.

So as to take account of this, a program proposes the corrections to be made to the initial reference system. The aim of the main functions provided by the latter is to ensure reliability of machining by removing material from the areas whilst minimizing the deviation between these areas so as to optimize their machining and by making the real and theoretical reference systems conform.

In fact, this involves an "ideal balancing" of the frame.

So as to ensure full accessibility to the elements being assembled in the frame, the girders or tubes, which constitute its framework, are disposed parallel to the reference axes, and the areas which are fixed there thus follow this geometry.

All the areas of a frame may thus be divided into three classes:

those areas having a colinear theoretical normal vector to the axis X;

those having a colinear theoretical normal vector to the axis Y, and those having a colinear theoretical normal vector to the axis Z.

Each of these areas may be subdivided into two categories:

the one whose normal vector is orientated along the positive direction of the axis;

the one whose normal vector is orientated along the negative direction of the axis.

The method used to mathematically balance the frame is the least error squares method able to minimize the deviation between the actual areas and the theoretical areas (rough surfaces and reference surfaces).

In order to be implemented, this method requires the modeling of deviations by linear relations according to the parameters to be optimized, which requires that the angular error between the two reference systems is small, which is certainly the case: the definition error due to the running total of the initial orientation deviations of the sighting system and the shape deviations of the frame remain smaller than 1°.

Reorientation of the frame is effected plane-by-plane:

the first plane providing two rotations and one translation;

the second one rotation and one translation, and the third providing the final translation.

This plane-by-plane implementation requires that all the selected areas for calculating reorientation have a final plane normal to one of the axes of the frame, this being the case for all the areas of a frame.

On the other hand, the fact that, within a class of areas, areas may exist having normal vectors of opposing directions, thus posing a problem for reorientation.

In effect, the algorithm looks for the position of the optimum plane so as to minimize the distance from the actual areas to the theoretical planes.

Each area category defines an independent mean plane. Thus, there are two distinct area planes per frame reference plane. As the space between these two planes is relatively large, the calculation of an intermediate plane cannot be obtained directly via the least error squares method as this does not take the machining direction into account. Certain areas after correction risk having a negative machining direction (which would require that more material be added).

Thus, it would be advisable to select an area category most representative of the reference plane of the frame to which it belongs.

The choice of this category is based on the surface calculated from the extreme areas of each category. The corrections thus obtained relying on the largest surface are more probable of being applicable to the other category of areas if one assumes that the frame is correctly constructed.

The position of the set of areas is measured with the aid of the aforesaid sight within the reference system initially defined by the sighting system. So as to reduce the number of observations and since extreme accuracy is not necessary, only the points P1 and P0 are sighted for each area, these two points defining the point Prp belonging to the actual area.

When a plane is selected, it is necessary to orientate it so as to obtain the smallest defect, this plane being a mean plane between two extreme planes.

One first set of corrections by rotation around three axes makes it possible to obtain a reference system so that the distance of the actual areas of the selected categories to their respective theoretical planes is optimal.

Then it is necessary to calculate the translations to be made so as to ensure machining over all the areas of the frame. The calculation of translation along an axis is determined by the half-distance between the two areas situated nearest their respective theoretical planes and each representing its category.

When all the areas of a given plane have the same orientation, a translation is calculated so that the real area closest its theoretical plane is situated 10 mm from this plane after correction, which results in a minimum all-in machining of 10 mm of the area.

When the machining device is hooked onto the frame, the weight of the latter not being neglectable, bending deformations shall occur in the frame girders, which may also undergo torsion forces according to the orientation of the machining device. All these deformations are elastic deformations and the elements moved shall recover their position after machining. However, such deformations are incompatible with the sought-after accuracy and need to be made up for.

Two types of corrections are provided:
a) a simple mechanical compensation consisting of keeping in place during the period of the operation the handling system of the machining device.

Because of this, the support girder of the frame shall only be subjected to one portion of the weight of the machining device;
b) as deformations still may be possible, a calculated compensation shall in addition be used to determine corrected coordinates which shall be used to control the machining device.

In fact, the sight used during orientation sighting comprises a magnetic seating solidly maintained on the area and integral with the latter during the hooking operation.

By sighting the three points P1, P2, P3, an axis system is determined associated with the sight before hooking of the machining device. As the sight does not move with respect to the area during this operation, its movement corresponds to the movement of the real area and also to that of the theoretical area, the deviation between these being small with respect to the dimensions of the frame.

The transformation to be carried out so as to correct the movements generated by hooking of the machining device onto the frame consists of regarding that the spatial reference system allocated to the point Ctp has been moved and orientated in such a way so that the points of the sight targetted prior to hooking and after hooking of the machining device onto the frame are merged. This transformation makes it possible to identify the movements of the real area and shall be applied to all the elements (points and vector) of the theoretical area.

Once the machining device has been hooked onto the frame, an initialization process is started up allowing the various axes of the machining device to be brought into a predetermined position. Thus, the geometry of the device is accurately determined.

The initial position of each axis may be the following:
axis Z at top stop point,
axes X and Y at half-travel,
axes of rotation around X and Y at half-travel,
piercing descent plate blocked against the trim correction plate.

In this initial position, the axis of rotation of the tool is parallel to the displacement axis Z of the machining device, and the working plane of the tool is parallel to the plane formed by the axes X and Y of the machining device.

By sighting the points M0, M1 and M2 of the machining device (situated, for example, within the plane of the X, Y table), it is possible to know:
the orientation of the tool in the space of the frame,
the orientation of the machining device in this space,
the position of any point belonging to the machining device and, more particularly, the position of the point of intersection of the two axes of rotation of the machining device, which represents the origin of the movements.

On the basis of the above, it is possible to calculate the corrections to be made to the plane of the tool so as to bring it into a plane parallel to the plane of the reference surface or theoretical area by acting on the possibilities of rotation around the axes X and Y, as defined earlier.

After having carried out the corrections required so as to bring the plane of the tool (for example, a cutter) parallel to the plane of the reference surface, orders shall be established to be supplied to the axis Z so as to carry out machining, as well as orders to be provided to the axes X and Y (X, Y table).

In particular, as the maximum cutting depth is 1 mm, the positions of the tool shall be calculated according to the axis Z during each passage. In order to achieve this, it is necessary to firstly determine the point furthest from the definitive plane. This point is one of the four corners of the area to be machined. Thus, it is necessary to calculate the coordinates of the four corners of the area, the difference between their positions and the plane of the definitive area giving the amount of material to be removed and thus the number of machining passages.

For any subsequent piercing operation, it shall be observed that the calculations are simplified owing to the fact that the coordinates of the point to be reached via the extremity of the tool are those of the holes to be executed, which have been defined at the time the frame is designed and are then expressed in the reference system linked to the machine.

In short, so as to pilot the machining device, it suffices to mention that the coordinates of the extremity of the tool and those of the point to be reached, expressed in the reference system linked to the machine, are merged.

What is claimed is:

1. A method for causing a rough surface on a girder of a frame structure being assembled to be machined to a plane reference surface defined by a specific equation, said method comprising the steps of:
   (a) storing data relating to the equation characteristic of said reference surface in a memory means;
   (b) using an optical sighting means to measure data characteristic of the position and orientation of said rough surface and using said data to calculate an equation which characterizes said rough surface;
   (c) comparing the data relating to the equations of said reference surface and said rough surface in an information processing unit;
   (d) positioning a mobile machining device mounted and moved on said girder of the structure frame being assembled close to said rough surface; and
   (e) correcting said rough surface with the aid of said machining device to progressively make the equations characteristic of the rough surface and the reference surface coincide with each other, said machining device being controlled by specific orders according to said comparison of the respective equations characteristic of the rough and reference surfaces, said orders being provided by said information processing unit.

2. The method according to claim 1, wherein said positioning step (d) includes, initializing the position of said machining device by bringing the various axes of the machining device into a predetermined position; said positioning step further comprising bringing a working plane of a tool of the machining device parallel to the plane of said reference surface.

3. The method according to claim 1, wherein, in step (d), the machining device is installed on said frame and wherein the order for controlling the machining device supplied by said information processing unit in correcting step (e) are corrected so as to take account of deformation of the frame generated by installing the machining device on said frame.

4. A system for causing a rough surface on a girder of a frame structure under assembly to be machined to a plane reference surface defined by a specific equation, said system comprising:

(a) memory means for storing the data relating to an equation characteristic of said reference surface;

(b) optical sighting means for determining data describing the position and configuration of said rough surface, said data making it possible to calculate an equation characteristic of said rough surface;

(c) a mobile machining device mounted and moved on the girder of the frame of said structure being assembled close to said rough surface; and (d) an information processing unit able to compare the data relating to first the equation of said reference surface, and second to said rough surface, and, on the basis of the comparison, to provide orders to said machining device to control the movements of said machining device to make the plane of said rough surface progressively coincide with the plane of said reference surface.

5. The system according to claim 4, wherein there are two rectangular mountings and a plate, the two rectangular mountings supporting the plate, the plate being blocked against the bottom of the girder, and wherein said machining device is mounted on said girder of the frame with the aid of the two rectangular mountings.

6. The system according to claim 4, wherein said machining device comprises an X, Y table.

7. The system according to claim 6, wherein there is a first plate and means able to at least partially rotate the first plate around a first axis Y, and the X, Y table is integral to the first plate, and wherein there is a second plate which is able to at least partially rotate around a second axis X which is orthogonal to said first axis and parallel to said X, Y table, and the table with the first plate unit is mounted on the second plate.

8. The system according to claim 6, wherein said machining device also includes a translation means along a third axis Z which is orthogonal to the plane of said X, Y table.

9. The system according to claim 4, wherein said machining device comprises a tool which has a shaft and which is driven in rotation by means of a gearing comprising a conical gearing with a conical wheel linked to the shaft of said tool.

10. The system according to claim 4, wherein said optical sighting means comprise a distance data processing measuring device provided with electronic theodolites connected to a computer.

11. The system according to claim 4, wherein said optical sighting means are associated with additional memory means in which the data relating to the equations characteristic of a plurality of reference surfaces are stored.

* * * * *